Feb. 20, 1934.　　　　　O. ZANCAN　　　　　1,948,195
MOTOR CAR BRAKING SYSTEM
Filed Aug. 28, 1931　　　2 Sheets-Sheet 2
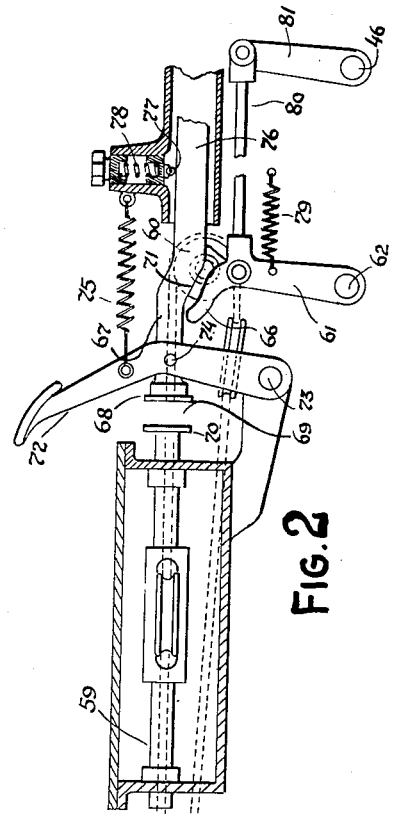
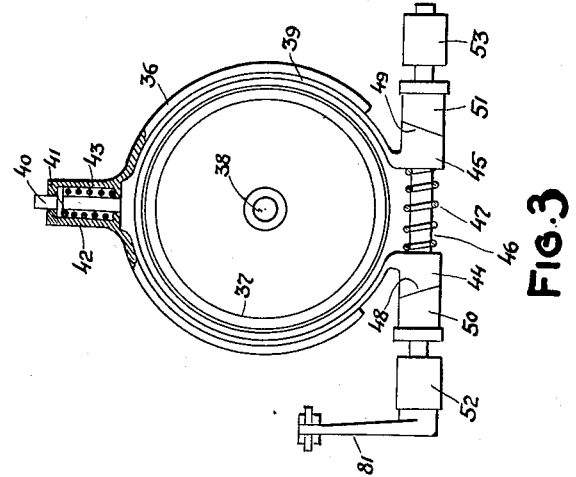
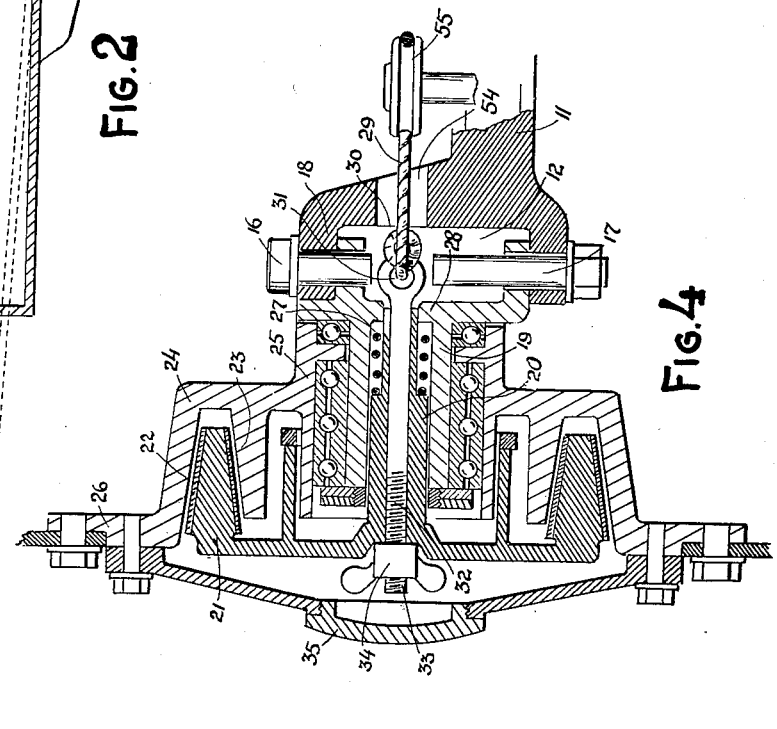
INVENTOR
Ottavio Zancan
BY his ATTORNEY Patented Feb. 20, 1934

1,948,195

UNITED STATES PATENT OFFICE 1,948,195

MOTOR CAR BRAKING SYSTEM

Ottavio Zancan, New York, N. Y.

Application August 28, 1931. Serial No. 559,831

15 Claims. (Cl. 188—204)

This invention relates to motor cars and more particularly refers to improvements in four-wheel braking systems.

Motor cars of ordinary construction are usually built for rear axle driving, and accordingly comprise two rear wheels each mounted on a shaft section inwardly extending to and actuated by the differential which is usually placed at the center of the axle housing. In certain types of motor trucks the rear wheels are rotatably mounted upon the axle, and are driven by means of chains, which are in their turn actuated by pinions carried by shafts forming part of a differential gearing.

In another patent application entitled Motor car axles and brakes, Serial No. 446,955, co-pending herewith, I have described and claimed a braking arrangement which may be applied to the rear axle of a front axle drive motor car, or to the front axle of a rear axle drive motor car, the same being also applicable to the rear axle of motor trucks, in which the rear wheels are rotatably mounted upon the axle and are driven by means of chains.

The main characteristic of said braking arrangement is that the braking devices provided for each of the two wheels at the opposite ends of the same axle are interconnected by means of a single actuating element, preferably of a flexible character, capable of simultaneously transmitting the braking pull to both brakes.

The main object of the present invention is to provide a novel and improved braking system for motor cars, wherein an arrangement such as described in my copending application above referred to is employed in connection with the front wheels and wherein the same controlling mechanism is made to operate the braking mechanism provided for the rear wheels so that a four-wheel braking system results.

Another object is to provide a four-wheel braking system for motor cars in which a single flexible element is used to control both the front and rear braking mechanisms, its operation requiring the use of a single brake pedal or lever.

A further object is to provide a four-wheel braking system for motor cars adapted for use in connection with wheels forming part of a differential driving system of the usual type and adapted for use at the same time in connection with a front axle where the wheel-carrying shafts are connected to the axle beam by means of knuckle joints in a well known manner.

A still further object is to provide in a motor car a four-wheel braking system controlled by a single flexible element whereby the braking action will be exerted first upon the rear wheels and will then be extended to the front wheels.

Further objects and advantages of the present invention will more fully appear as the description proceeds and will be set forth and claimed in the appended claims.

My invention is illustrated by way of example in the accompanying drawings, in which:

Fig. 2 is a partly sectioned fragmentary view in elevation thereof.

Fig. 3 is a detail front view of the braking mechanism attached to the rear axle; and Fig. 4 is a fragmentary rear view in elevation, partly sectioned, of one of the ends of the front axle shown in Figs. 1 and 2.

Figure 1:
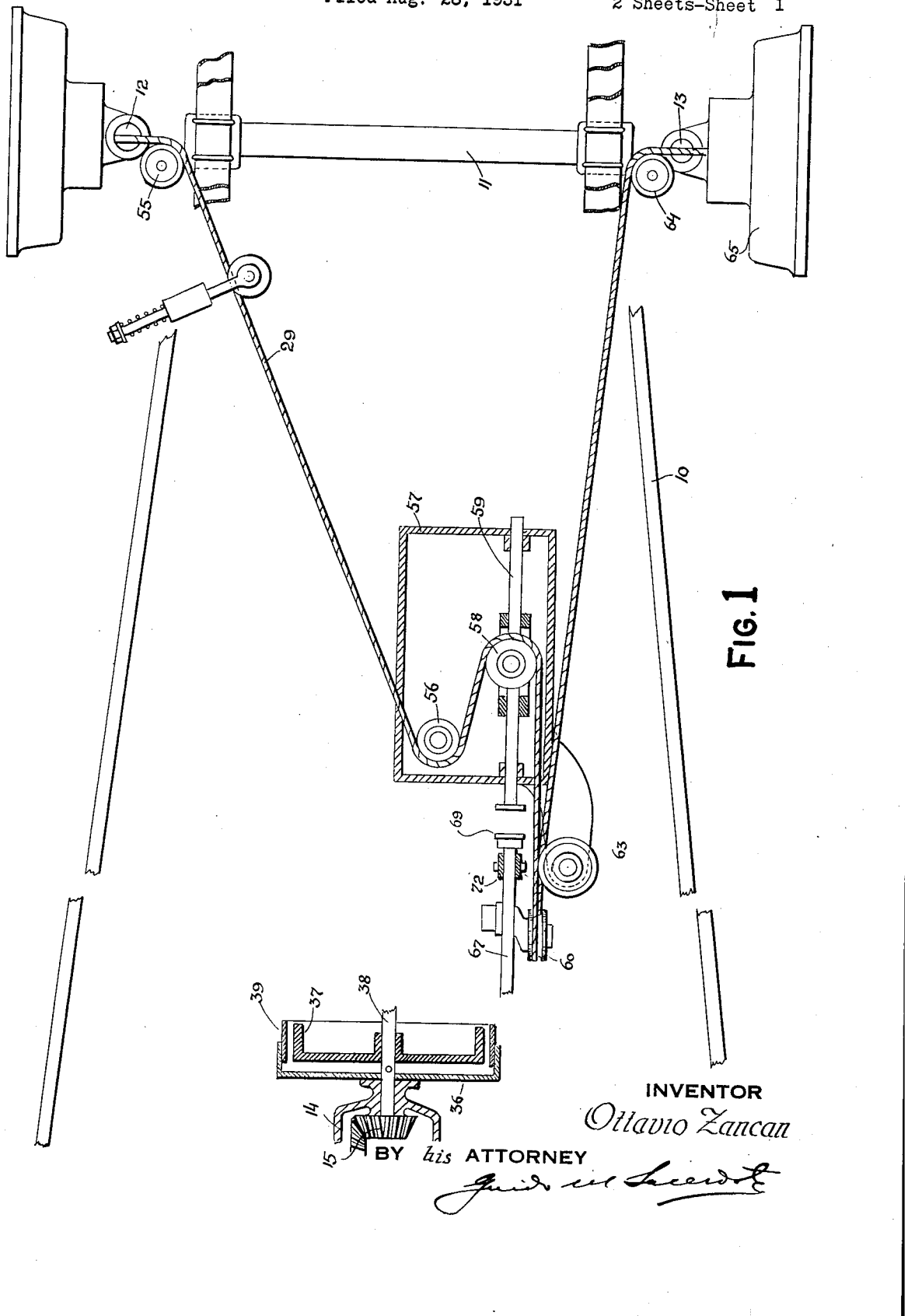
Fig. 1 is a fragmentary plan view, partly sectioned of a motor car frame embodying my invention.

Referring to the drawings 10 designates the chassis of a motor car, 1 the front axle provided with knuckle joints 12, 13, and 14 designates the housing for the differential gearing, including the driving pinion 15, forming a part of the rear axle.

Referring more particularly to Fig. 4, 16, 17 designates two co-axial vertical studs forming part of a knuckle joint connection between the forked end 18 of the axle bar or beam 11, and a hollow axle 19.

Within said hollow axle is slidably mounted an inner hub extension 20 of a conical disk 21, adapted to engage friction surfaces 22, 23 of cup 24, forming part of the hub 25 of wheel 26, rotatably mounted upon said axle. When friction disk 21 is moved inwardly it will exert a braking action against the wheel. Normally, however, said friction disk is out of engagement with surfaces 22, 23, due to the action of a spring 27 interposed between bottom 28 of the hollow axle and hub extension 20.

The brake member of the wheel at the left shown, is connected to the brake member of the wheel at the opposite side (not shown) by a flexible element 29, the end of which 30 is connected to an eye-bolt 31, the stem of which 32 axially passes through and beyond hub extension 20, its outer end 33 being threaded and retained in position by a nut 34.

The flexible element is normally maintained under tension opposing the action of spring 27 and it is obvious that the tension may be increased or decreased and any slack in the flexible element taken up by the operation of nut 34, access to which may be easily had, by the removal of cap 35.

The flexible element 29 also connects the two front braking members to the lever controlling the rear braking mechanism. Instead of using a brake in connection with each rear wheel I simplify the construction of the rear axle by providing a friction brake controlling the driving pinion of the differential, and causing the same to be actuated by the same flexible element 29, which actuates the front wheel brakes.

In this manner I do away with the necessity of using two brakes in connection with the rear axle, the braking action of a single brake associated with the differential driving pinion being simultaneously transmitted to both wheels.

The brake thus associated with the driving pinion may be of any suitable design. For instance, the same may be of the friction band type shown, currently used for emergency brakes. The same comprises a stationary cup member 36, fixed upon the differential housing 14, a drum 37 mounted upon shaft 38 of the differential pinion 15 and a flexible band 39 interposed between cup member 36 and drum 37. The upper part of said band is provided with a pin 40, having a shoulder 41, inserted within a housing 42 integral with cup member 36, and spring 43 bearing against shoulder 41, normally retains band 39 away from drum 37, permitting said band being drawn against said drum.

Band 39 is split at its lower end and is formed integral with two co-axial lugs 44, 45, slidably mounted upon a shaft 46 and normally held apart by a spring 47.

Said lugs have inclined outer surfaces 48, 49, against which bear similarly inclined outer surfaces of bushings 50, 51, fixed upon shaft 46, said shaft being rotatably mounted on supports 52, 53.

By virtue of this construction it is obvious that when shaft 46 is rotated the inclined surfaces of bushings 50, 51, will exert a cam action against the adjoining inclined surfaces of lugs 44, 45 and will force the same inwardly so as to contract band 39 and to force it against the outer surface of drum 37.

Referring to Figs. 1 and 4, it will be seen that flexible element 29 after passing through an opening 54 provided through the forked end of the front axle member, runs over an idler pulley 55 and from there to another idler pulley 56, rotatably mounted in the grease box 57. From said pulley 56 the flexible element then rides over another pulley 58, carried by a bar 59 slidably mounted within said grease box and capable of movement in a front or rear direction, then it passes over and around another pulley 60 carried by a lever 61, pivotally mounted at 62 and then riding over an idler pulley 63 it reaches idler pulley 64 at the other end of the front axle and is thereby deflected to an axial direction, so that it may be connected to the brake member of the wheel 65 at the opposite end.

The upper end of the lever 61 is frontwardly deflected to form a tip 66 over which rides the cam bar 67. The front end 68 of said cam bar is separated by a space 69 from the rear end 70 from sliding bar 59. Cam member 67 is deflected downwardly at the rear of tip 66 so as to form an inclined surface 71, which will bear against said tip causing lever 61 to rotate a certain angle in a frontward direction when cam member 67 is moved towards the front of the car. Such a movement of the cam member can be effected by means of a brake pedal 72, pivotally mounted at 73 and connected at 74 to said cam member, said brake pedal being normally retained in its inoperative position shown, by a spring 75.

The rear portion 76 of cam member 67 is preferably pressed downwardly by a roller 77 against which presses a spring 78, this serving to take up any wear that takes place in the cam surface.

Lever 61 is normally held in its inoperative position shown, by a spring 79. Said lever is connected by a connection 80 to another lever 81 at the rear, which is mounted upon brake shaft 46.

As a result, it will be seen that when lever 61 is angularly displaced towards the front of the car, lever 81 will be similarly displaced causing the brake band to contract.

The movement of lever 61 caused by cam member 67 is preferably sufficient to cause a certain amount of braking action on drum 37, but not to force brake band 39 tightly about said drum.

In operation, when the brake pedal is first deflected, cam surface 71 riding over tip 66 will cause a certain amount of braking action to take place at the rear. After front end 68 of cam member 67 has covered the gap 69 separating it from the rear end of the bar 59, said cam member 67 will begin to press against sliding bar 59, thus causing pulley 58 to bear with increasing tension against flexible element 29, and thus gradually drawing the brake members of the front wheels inwardly. The braking action thus exerted upon the front wheels will take place simultaneously upon both wheels and will also be automatically balanced so as to equalize the frictional resistance applied to the two wheels.

As or before the front end 68 of cam member 67 reaches rear end 70 of sliding member 59, the cam surface 71 will have completed its deflecting action upon lever 61 and said lever will remain substantially stationary, so far as the further frontward movement of the cam member is concerned. However, as soon as tension is exerted on the flexible element 29, said tension will also be transmitted to pulley 60 carried by lever 61, so that as said tension increases said lever will be pulled forward to a greater degree, increasing the braking action of band 39.

The arrangement may, of course, be modified so as to exert a braking action simultaneously upon all four wheels, if desired, but in practice it has been found preferable to brake the rear wheels first so as to generate a sort of a drag on the car structure, preventing the possibility of the car turning over, which exists when a braking action is suddenly exerted on the front wheels of a car traveling at a relatively high speed.

It is, of course, within the scope of my invention to cause lever 61 to actuate braking means at the rear other than those shown.

For instance, connecting rod 80 may be caused to exert a pull upon a pulley inserted in the loop of a flexible element connecting two rear wheel braking members similar to those illustrated in Fig. 4 for the front wheels. Such an arrangement can be adopted, for instance, in connection with braking mechanism adapted for use in connection with the rear axle of a truck, in which each wheel is driven by a chain from a differential shaft ahead of the axle, in which case a braking mechanism of the type illustrated in Fig. 1 of my copending application above mentioned, can be employed.

It will be observed that since the brake drum 37 is mounted directly upon the differential pinion shaft, the ensuing braking action is free of the vibrations which take place in connection with the action of the emergency brake, which is mounted upon the transmission shaft ahead of the universal joint.

A note-worthy advantage of the braking mechanism shown in connection with the rear axle is that the same does not require any substantial modification in ordinary standards of rear axle design.

Another quite important advantage is that by the use of a single drum mounted upon the differential pinion shaft, the use of the two brakes now employed in connection with the rear wheels may be done away with, so that a single brake can be used in the place of two.

Still another advantage which is very important from a practical standpoint is that by thus doing away with the use of the brakes at the wheels, a condition which is a constant source of expense and inconvenience is corrected at the same time, by this being meant the possibility of grease from the differential making its way along the wheel shafts and reaching the brakes, causing the same to slip and otherwise impairing their usefulness.

From the foregoing, it will be seen that I provide a novel and improved four-wheel braking arrangement for motor cars which can be applied in connection with cars of standard design without requiring any material changes in their construction. Said arrangement is of such a nature as to insure an automatic balance in the braking action taking place at the two sides of the car and can also be made so that it will insure a certain amount of braking action taking place at the rear before the front wheels are acted upon.

A braking arrangement of the type described can be produced in ways different from that shown, without departing from the inventive idea. The drawings, therefore, will be understood as being intended for illustrative purposes only and not in a limiting sense.

I accordingly reserve the right to carry my invention into practice in all those ways and manners which may enter, fairly, into the scope of the appended claims.

I claim:

1. In a motor car the combination, with front and rear brakes, and means for operating said rear brake, of a flexible element connected to and controlling said front brakes and said rear brake operating means, and means for first actuating said rear brake operating means, and then said flexible element to actuate said front brakes and further actuate said rear brake operating means.

2. In a motor car, a front axle comprising two wheel supports one at each side thereof, wheels rotatably mounted on said supports, braking means for said wheels, a propeller shaft, a braking mechanism therefor, a flexible element connecting said two front braking means and said braking mechanism, and means to set said flexible element under tension so as to actuate said braking means and said braking mechanism.

3. In a motor car, a front axle comprising two wheel supports one at each side thereof, wheels rotatably mounted on said supports, braking means for said wheels, a rear braking mechanism, a flexible element connecting said two braking means and said braking mechanism, and means to actuate said braking mechanism, and to subsequently set said flexible element under tension to actuate said braking means, and further actuate said braking mechanism.

4. In a motor car, a front axle comprising two wheel supports one at each side thereof, wheels rotatably mounted on said supports, braking means for said wheels, a rear braking mechanism comprising an actuating member, a flexible element connecting said braking means and said actuating member, and means for first operating said actuating member, and then setting said flexible element under tension to actuate said braking means and further operate said actuating member.

5. In a motor car, a front axle comprising two wheel supports one at each side thereof, wheels rotatably mounted on said supports, braking means for said wheels, a rear braking mechanism comprising an actuating member, a flexible element connecting said two braking means and said actuating member, cam acting means for first operating said actuating member, and then setting said flexible element under tension to actuate said braking means and further operate said actuating member, and a lever under the control of the operator controlling said cam acting means.

6. In a motor car, a front axle comprising two wheel supports one at each side thereof, wheels rotatably mounted on said supports, braking means for said wheels, a rear braking mechanism comprising an actuating member, a flexible element connecting said two braking means and said actuating member, a movable deflecting member engaging said flexible element and adapted to set the same under tension to actuate said braking means and to operate said actuating member, and cam acting means for first operating said actuating member, and then move said deflecting member to actuate said flexible element.

7. In a motor car, a front axle comprising two wheel supports one at each side thereof, wheels rotatably mounted on said supports, braking means for said wheels, a differential driving pinion, a shaft for said driving pinion, a braking mechanism for said pinion, comprising a brake drum mounted directly upon said shaft, a flexible element connecting said two braking means and said braking mechanism, and means to set said flexible element under tension so as to actuate said braking means and said braking mechanism.

8. In a motor car, a front axle comprising two wheel supports one at each side thereof, wheels rotatably mounted on said supports, braking means for said wheels, a differential driving pinion, a shaft for said driving pinion, a braking mechanism for said pinion, comprising a brake drum mounted directly upon said shaft, an actuating member for said braking mechanism, a flexible element connecting said braking means and said actuating member, and means for first operating said actuating member, and then setting said flexible element under tension to actuate said braking means and further operate said actuating member.

9. In a motor car, a front axle comprising two wheel supports one at each side thereof, wheels rotatably mounted on said supports, braking means for said wheels, a differential driving pinion, a shaft for said driving pinion, a braking mechanism for said pinion, comprising a brake drum mounted directly upon said shaft, an actuating member for said braking mechanism, a flexible element connecting said braking means and said actuating member, cam acting means for first operating said actuating member, and then setting said flexible element under tension to actuate said braking means and further operate said actuating member, and a lever under the control of the operator controlling said cam acting means.

10. In a motor car, a front axle comprising two wheel supports one at each side thereof, wheels rotatably mounted on said supports, braking means for said wheels, a differential driving pinion, a shaft for said driving pinion, a braking mechanism for said pinion, comprising a brake drum mounted directly upon said shaft, an actuating member for said braking mechanism, a flexible element connecting said braking means and said actuating member, a movable deflecting member engaging said flexible element, adapted to set the same under tension to actuate said braking means and to operate said actuating member, a cam acting bar for first operating said actuating member and then move said deflecting member to actuate said flexible element, and a pedal controlling said bar.

11. In a motor car, a front axle comprising two wheel supports one at each side thereof, wheels rotatably mounted on said supports, an equalizing braking mechanism for said wheels, a differential driving pinion, a propeller shaft for said pinion, a brake for said shaft, and an actuating member therefor interconnected with said braking mechanism.

12. In a motor car, a front axle comprising two wheel supports one at each side thereof, wheels rotatably mounted on said supports, an equalizing braking mechanism for said wheels, a differential driving pinion, a propeller shaft for said pinion, a brake for said shaft, an actuating member therefor interconnected with said braking mechanism, and means under the control of the operator for first operating said actuating member, and then operating said braking mechanism.

13. In a motor car, a front axle comprising two wheel supports one at each side thereof, wheels rotatably mounted on said supports, a brake for each wheel, a differential driving pinion, a propeller shaft for said pinion, a brake for said shaft, and equalizing means connecting and operating said three brakes.

14. In a motor car, a front axle comprising two wheel supports one at each side thereof, wheels rotatably mounted on said supports, a brake for each wheel, a differential driving pinion, a propeller shaft for said pinion, a brake for said shaft, and a flexible element connecting and operating said three brakes.

15. In a motor car, a front axle comprising two wheel supports one at each side thereof, wheels rotatably mounted on said supports, a brake for each wheel, a differential driving pinion, a propeller shaft for said pinion, a brake for said shaft, a flexible element connecting and operating said three brakes, and means under the control of the operator for first effecting partial operation of said propeller shaft brake, then setting under tension said flexible element to operate said front brakes, and further operate said propeller shaft brake.

OTTAVIO ZANCAN.